Aug. 26, 1941. A. C. FISCHER 2,253,513
SELF-CONDITIONING EXPANSION JOINT
Filed March 7, 1939 2 Sheets-Sheet 1
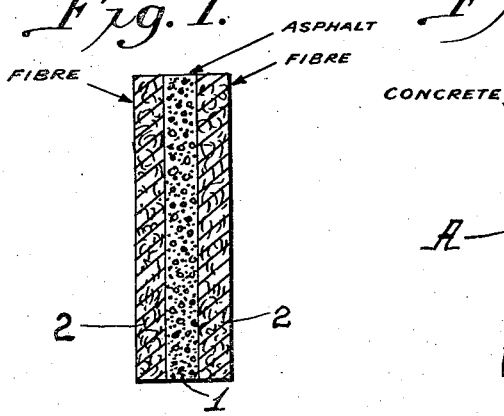
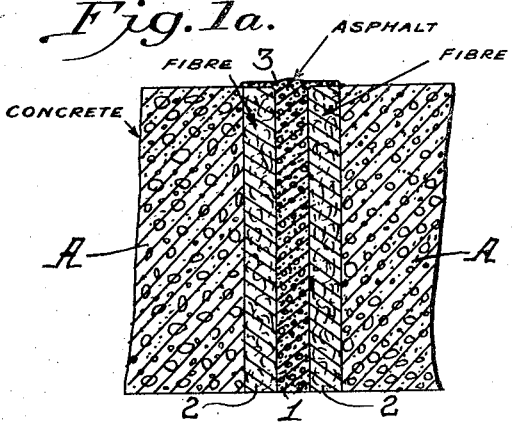
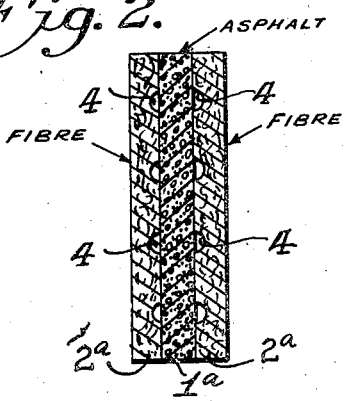
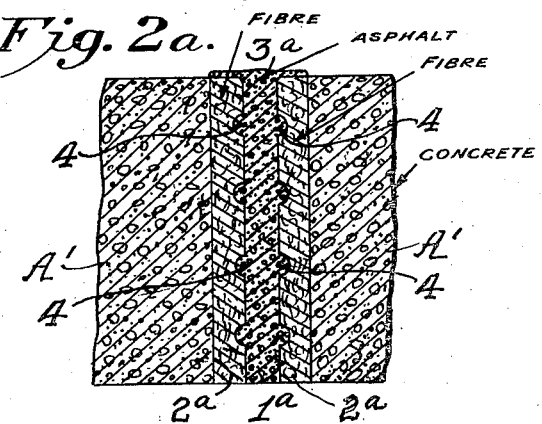
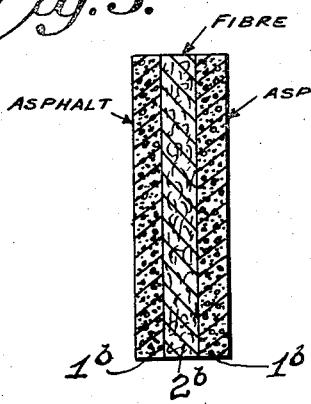
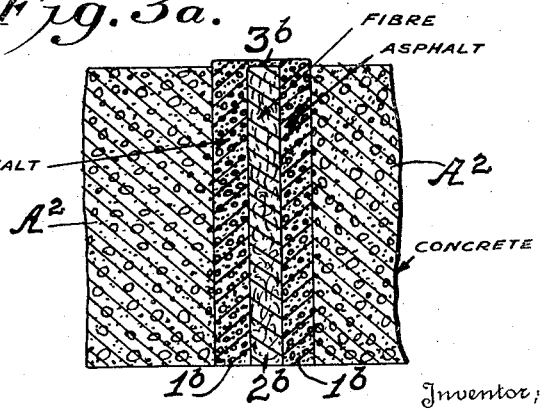
Inventor:
Albert C. Fischer,
By Knight Bros
Attorneys.

Aug. 26, 1941.    A. C. FISCHER    2,253,513
SELF-CONDITIONING EXPANSION JOINT
Filed March 7, 1939    2 Sheets-Sheet 2
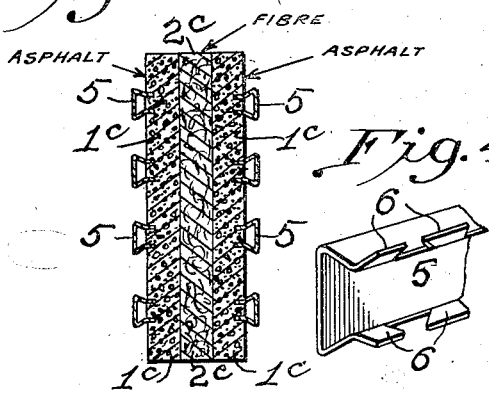
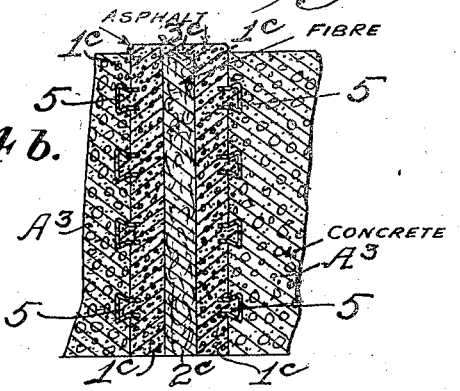
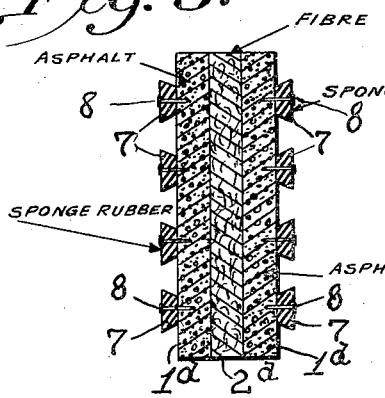
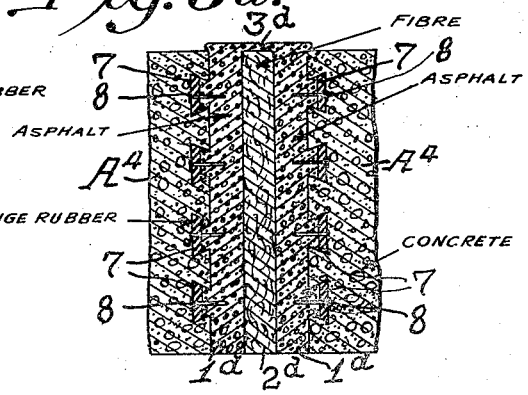
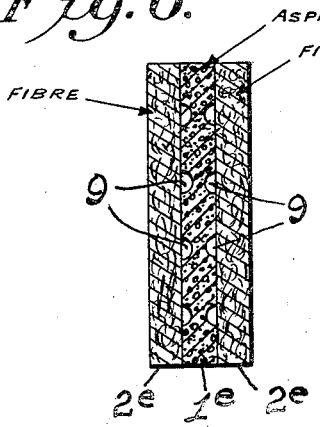
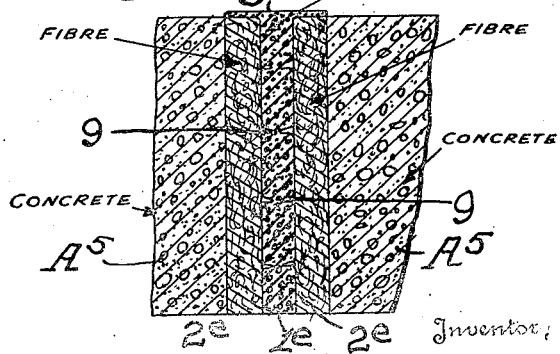
Inventor:
Albert C. Fischer,
By Knight Bros,
Attorneys.

Patented Aug. 26, 1941

2,253,513

UNITED STATES PATENT OFFICE 2,253,513

SELF-CONDITIONING EXPANSION JOINT

Albert C. Fischer, Chicago, Ill.

Application March 7, 1939, Serial No. 260,443

10 Claims. (Cl. 94—18)

This invention relates to the method of and materials for use in establishing waterproofing expansion and other joints between members of masonry structures, sections of paving and other structures; and particularly joints of the kind which employ slab-like bodies of asphaltic or other plastic material in making up the joint.

It has long been the practice to pre-form at a place selected for convenient manufacture and ship to the place of use the bodies of plastic material used in constructing the joints in question, but considerable inconvenience and difficulty has been experienced in so doing, owing to the wide difference between the degree of plasticity of the body which is best for shipment and handling and the condition of plasticity in which the body must exist while in use, if it is to fully serve the purposes for which it is intended. For instance, if an asphaltic body is initially made soft and pliable or has a degree of inherent plasticity sufficient to enable it to readily conform to surfaces to which it must adhere in effecting a waterproof joint; or a plasticity which renders it readily responsive to changing distances between the members between which it is located, it becomes quite difficult to so protect the plastic body during shipment and handling as to prevent it from losing its appropriate shape, especially during higher climatic temperatures. Accordingly, the present invention contemplates the production, shipment, and preferably the installation of the plastic body with an initial inherent degree of plasticity that enables the body to retain its form and physical condition during shipment and handling under any and all temperatures, and thereafter, while in position of use, automatically changing its inherent plasticity to a degree which enables it to fully serve its intended purposes. For instance, plastic bodies of the kind under discussion, which are customarily prepared in the form of slabs, plates or sheets from asphaltic or other plastic waterproof material having an appropriate point of fusion or plasticity, is mixed with a suitable filler such as fiber, diatomaceous earth, fuller's earth, shoddy dust, or pulverized calcium carbonate or other stone, in proportions which, in accordance with the present invention will leave the body with a relatively low degree of plasticity; these bodies are shipped to the place of use while in this state of low plasticity and relative immunity to deforming influences; and then introduced into position between the sections of paving or other masonry, accompanied by a solvent or equivalent rectifying material, capable of imparting to the plastic body, by a gradual process of absorption, the degree of plasticity which the plastic body should have in use; for instance by loading the rectifying fluid into one or more plate-like bodies of fibrous or other cellular material adapted to remain in contact with one or more faces of the plastic material and transfer the fluid to the latter.

The invention further contemplates constructing a waterproofing or expansion joint of the kind herein set forth with spaces or cavities or appropriately distributed compressible bodies capable of yielding and forming cavities in such communication or relation to the body of plastic material, when in use, as will admit material of the plastic body, under pressure, such as would develop from thermal expansion of the two structural members between which the joint is located, and thereby limit the portion of the plastic material which, under conventional conditions, extrudes from the space of the joint, for instance, at the surface of a pavement containing the expansion joint or upon the surface of a wall containing the waterproofing joint and thus conserving the material of the plastic body for its intended purposes rather than letting it go to waste.

In the accompanying drawings which show a number of embodiments of the invention by way of illustration, Figures 1 and 1a are sectional views of one embodiment of the invention in which two vehicles of solvent are located on either side of the asphaltic packing body; Fig. 1 showing the members of the joint in their initial condition before introduction into the place of use and Fig. 1a showing the embodiment in position of use between two sections of concrete paving.

Figures 2 and 2a are views corresponding to Figures 1 and 1a in which the members of the joint are modified to the extent of providing, in the solvent-containing bodies, recesses into which plastic material may flow under pressure incident to the use of the joint.

Figures 3 and 3a are views showing, before and during use, an embodiment of the invention in which the plastic element of the joint is subdivided into 2 slabs and the solvent vehicle is located between these slabs.

Figures 4 and 4a are views of an embodiment before use and while in use respectively, in which recesses for the reception of displaced portions of the plastic body are provided through means of suitably distributed metallic shells; Fig. 4b being a detailed view of such a shell on an enlarged scale showing the means employed for mounting the shells upon the asphaltic bodies temporarily or until the poured concrete embeds the shells and fixes their location permanently.

Figures 5 and 5a are views corresponding substantially to Figures 4 and 4a in which a material, subdivided into a plurality of distributed bodies, is employed in a manner to be temporarily mounted upon the expansion joint structure until embraced by the poured concrete and thereafter serving by compression of the material to provide relief spaces for surplus plastic material displaced under the pressure of use.

Figures 6 and 6a are views similar to Figures 4, 4a and 5, 5a in which recesses providing relief for displaced plastic material, are formed in the plastic material itself and adapted to be closed up by the flow of the plastic material under pressure incident to use, and thereby restrict the proportion of plastic material extruded from the joint to a position where it is wasted.

Referring to Figures 1 and 1a, 1 represents a plate or slab-like body of plastic material made in accordance with the known practice of asphaltic material and a filler in sufficient proportions to render to the body a form that will be retained under normal influences of temperature, pressure incident to packing and handling, and inherent weight of the material when standing on edge. As ordinarily made, a plastic plate of this kind may be introduced between portions of a wall or other masonry structure, sections of concrete paving, or other similar situations for the purpose of making a joint that will be waterproof and may expand and contract under the conditions of use. In order to best serve its functions in use, plate 1, according to practice prior to the present invention, has been made with a degree of inherent plasticity that imposes considerable difficulty in maintaining the shape of the article when exposed to atmospheric heat or deforming forces incident to shipment and handling. According to the present invention, the body 1 is made with a degree of inherent plasticity, for instance, by selecting proportions of asphalt and solvent, or proportions of asphaltic material and filler, or selectively determining both said factors in a manner to lend to the body such a minor degree of inherent plasticity as will leave it self-sustaining in form and immune to deteriorating physical forces encountered in shipment and manipulation; and in lieu of initially lending to the body the degree of relatively high inherent plasticity appropriate to the functions which it is intended to serve in use, the present invention provides means for rendering the body self-conditioning. The self-conditioning means may consist of any adjunctive device which will impart to the body of low plasticity, a solvent or fluid ingredient that will impart to the body a relatively higher degree of plasticity; such means being preferably one or more vehicular bodies, layers, strata or the like capable of containing conditioning fluid and keeping it in such relation to the plastic body as will insure its transfer to the plastic body under the principle of absorption; this absorption preferably to be carried on gradually; and preferably also, over a period of time sufficiently protracted to maintain a desired degree of plasticity and thereby prolong duration of ideal conditions in the plastic body; in other words, prolong the life of the joint.

According to the preferred application of the operative principle of the invention and that form which, with several modifications of details, is herein presented for purposes of illustration, the vehicular conditioning means may consist in one or more fibrous or other porous slab-like bodies 2 contiguous to the plastic body 1 and so saturated with the fluid ingredient relied upon to render the plastic body self-conditioning, that transfer of said ingredient from the vehicular body to the plastic body may take place under the active principle of absorption. According to Figures 1 and 2, a vehicular body 2 is located on either side of the plastic body 1 and the three bodies constitute a packing adapted to be introduced between two bodies of masonry, sections of paving or the like, as illustrated, for instance, in Fig. 1a, where A, A represent fragments of two subdivisions of concrete paving. Fig. 1a also illustrates the results of compression that has taken place in the packing 1, 2, for instance, under pressure resulting from thermal expansion of the paving members A, A in use; the principal phenomena resulting from which are increased intimacy in the presentation of the conditioning ingredient to the asphaltic body and extrusion of a portion of the asphaltic body upon one margin of the joint (as shown at 3) where it mushrooms or flows over the joint in a manner to hermetically seal the latter and render it proof against admission of water, which under freezing or other conditions might tend to disrupt the joint.

Figures 2, 2a represent substantially the same joint as that shown in Figures 1, 1a with the addition of illustrative means for taking up a portion of the plastic material displaced or caused to flow under pressure incident to use and thereby limiting extrusion of plastic material to that needed for sealing the margin of the joint; these means consisting in this instance of recesses 4, formed in those faces of the fibrous vehicular base 2a, which are presented to the lateral faces of the plastic body 1a so that, as shown in Fig. 2a, deformation of the plastic body under pressure incident to use, will cause said plastic body to flow into said recesses 4 and by thus compensating for reduction of transversed dimension of the plastic body prevent excessive extrusion of the material of said body at 3a.

As shown in Figures 3 and 3a, it is not necessary that the vehicular bodies be applied to external faces of the plastic body. Instead, the plastic body may be divided into 2 slabs 1b and have a single vehicular body 2b located between them where by contiguity between the bodies, the saturated body will give off to both subdivisions of the plastic body the conditioning fluid in accordance wtih the principle of the invention. Where the plastic body is subdivided, as shown in Fig. 3, deformation or flowing thereof under pressure incident to use causes extrusion from both of the subdivisions, as shown at 3b in Fig. 3a where the extruded portions fold over the margin of the fibrous vehicular body and seal the latter against the admission of moisture. In Fig. 3a the sections of concrete, between which the joint is formed, are indicated at A2; the subdivided sections of the asphaltic body are indicated at 1b and the single intermediate body of fiber or other porous material that carries the conditioning fluid is indicated at 2b.

According to Figures 4 and 4a, means other than that of forming recesses in the constituent physical elements of the joint, may be employed for taking up surplus plastic material flowing under pressure incident to use. For instance, a plurality of boxes 5 of minor dimensions may be suitably distributed in receiving relation to surfaces of the subdivided slab-like plastic bodies 1c, for instance, by providing the boxes with tangs 6 embedded in the surfaces of the plastic material at suitable points to hold the boxes in place until the material of the paving is cast about the boxes after which, of course, the boxes are permanently held in position to receive displaced portions of the plastic material and thereby partially compensate for the reduction of transverse dimensions of the plastic material under the pressure of use, as illustrated in Fig. 4a and prevent excessive extrusion and waste of the plastic material at 3c without, however, unduly detracting from the flow of such plastic material at 3c, required for rendering the joint water tight.

As shown in Figures 5 and 5a, provision of compensating recesses for displaced plastic material may be provided by distributing an appropriate number of bodies 7, of compressible material (for example, sponge rubber) over the surfaces of the plastic slabs 1d, and securing the same in position by any suitable means such, for instance, as tacks 8, so that while lending form to the cast concrete A4 and preventing obliteration of the desired spaces, said compressible bodies will yield nevertheless to pressure of the flowing plastic material and (as shown in Fig. 5a) by compensating for the displaced material will prevent excessive extrusion at the point 3d.

Figures 6 and 6a show a joint corresponding in principle to that shown in Figures 1 and 2, but having pockets 9 molded in the plastic body 1e so that the body of plastic material, as shown in Fig. 6a, may flow in a direction to close these pockets and by resultant compensation prevent excessive extrusion at the mushroom 3e under pressure imposed by the paving sections A5 as shown in said figure.

As an illustrative material suitable for use in producing the plastic body entering into a self-conditioning expansion joint in accordance with the present invention, take a mixture composed of 70% asphalt, 10% fiber, and 20% mineral filler. The asphalt will preferably have a melting point of from 200 to 400° F. and having its degree of toughness, hardness or plasticity determined by proper selection of a melting point within this range or by adding lower melting point asphalt or higher melting point asphalt as may be found more convenient. To this asphalt, may also be added, Gilsonite, say, in a proportion which, when added to a blown, crude asphalt having a melting point of 250° F., will produce a tough consistency. The fiber entering into the formula may be wood, digested to remove its legume or corn stalk fiber or cane fiber or even mineral fiber; the fiber being worked to subdivide it into a cellular structure or structure having a large part of its volume made up of interstices into which the asphalt may enter when mixed therewith. The mineral may be pulverized limestone.

The vehicular body of fibrous material which carries the conditioning fluid may consist of fibrous materials already referred to, properly formed into mats or other bodies with structural integrity subjected to impregnation by the conditioning liquid and pressed or otherwise treated to regulate the amount of conditioning liquid carried by each unit of the vehicle. Commercially available porous, fibrous bodies having inherent structural integrity may be employed as the vehicular elements of the joint, for instance, Maizewood, Celotex, Fir Tex, gypsum board, masonite, etc. The plate, board, or the like constituting the vehicular element may be from one-fourth of an inch to one inch in thickness according to circumstances.

A suitable formula for the saturant or automatically conditioning element of the joint would be mineral spirits containing from 35% to 45% bituminous material or 35% to 40% polymerized oil. Where the cost is not prohibitive the saturant or automatically conditioning element of the joint could be supplied by vegetable oil in its natural state with or without a preservative percentage of mineral oil or other preservative. The present invention contemplates the use of a retardant for regulating the flow of dilutant or automatic conditioner to the asphaltic body and this retardant may serve as a means for cementing the sides of the vehicular bodies of fiber board or the like porous sheet material, to the sides of the asphaltic body. For instance, in the loading of the fiber board with the dilutant solvent or conditioning fluid, a vegetable oil or mineral oil base may be used; and rubber cement, bakelite coating binder and various other binders which may be used for the purpose of painting one of the surfaces through which said fibrous sheet and asphalt body oppose each other and which, by reason of the pores in the surface of the fibrous sheet, will not wholly seal said surface but have the effect, merely, of retarding, to a greater or lesser degree, the passage of this conditioning fluid to the plastic material. By the same means the quantity of saturant or conditioning fluid remaining in the vehicular body after charging and the prolongation of supply to the plastic body while in use may be regulated. The greater the volume of oil permitted to remain, the greater will be the softening effect upon the plastic composition reckoned from the initial degree of hardness of said composition. Where the saturant is very light and little oil remains in the fibrous vehicular structure after pressure thereon, the more porous may be the structure and the less may be the retardation of flow of oil to the plastic composition. In any case retardants will be regulated to have their effect upon the flow of conditioning oil for a limited period only.

I claim:

1. A self-conditioning expansion joint comprising a slab of packing material having the capacity to absorb a solvent and thereby acquire inherent plasticity and a vehicular body contiguous to said slab carrying an appropriate solvent and presenting the same in position to respond to the absorptive influence of the slab.

2. A self-conditioning expansion joint as described in claim 1 in which the vehicular material is of fibrous constituency.

3. A self-conditioning expansion joint as described in claim 1 in which the vehicular material comprises a felted fibrous mass having inherent structural integrity and adhered to and structurally sustaining the packing slab.

4. A self-conditioning expansion joint as described in claim 1 in which the packing slab has a body of vehicular material on each side thereof.

5. A self-conditioning expansion joint as described in claim 1 in which the vehicular material has upon its face presented toward the packing slab, means retarding the escape of solvent from the vehicular material to the said slab; and said vehicle material and slab being adhered together through the medium of said means.

6. A self-conditioning expansion joint comprising a slab of packing material having the capacity of absorbing an appropriate solvent and acquiring inherent plasticity therefrom and a vehicular body containing solvent and presenting the same in position to respond to absorptive influence of the packing body; said joint being adapted to be positioned between sections of masonry in a manner to subject both the packing material and the vehicular material to pressure imposed by the sections of masonry; and one of said materials being constructed with recesses in position to admit flow of packing material under such pressure and thereby limit the packing material extruded from the joint.

7. A self-conditioning expansion joint as described in claim 6 in which the recesses are formed in a face of the vehicular material which is presented to a lateral face of the packing material.

8. A self-conditioning expansion joint as described in claim 6 in which adjunctive devices define the recesses for the reception of flowing packing material and these adjunctive devices are between a surface of the packing material and a section of masonry.

9. A self-conditioning expansion joint as described in claim 6 in which adjunctive devices define the recesses for the reception of flowing packing material and these adjunctive devices are between a surface of the packing material and a section of masonry and consist of bodies of material having inherently a degree of compressibility that permits them to yield to the pressure under which the packing material flows, and thereby afford spaces into which the packing material may flow and restrict the amount of packing material excluded from the joint.

10. A self-conditioning joint for use between sections of masonry, said joint comprising a slab of plastic material having an initial degree of plasticity of a relatively low order and a porous vehicular body of material charged with a conditioning fluid that is presented by said vehicular body into a relation to the plastic body that causes transfer of the conditioning fluid by the process of absorption; said joint having between said vehicular body and said slab a retardant that limits the rate of flow without wholly interrupting the passage of the conditioning medium to the plastic body.

ALBERT C. FISCHER.